March 3, 1964  G. BÖDEKER  3,123,028
DEVICE FOR CONTROLLING THE PRESSURE IN A FURNACE CHAMBER
Filed June 12, 1961
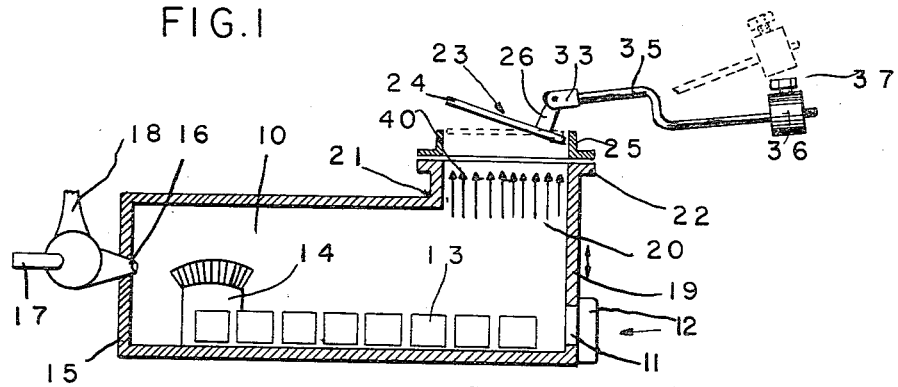
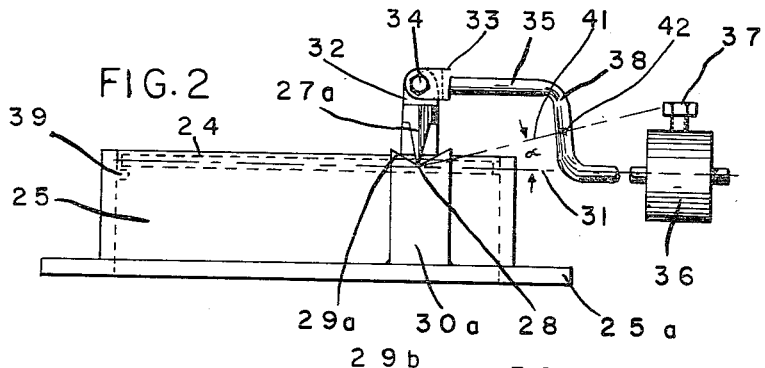
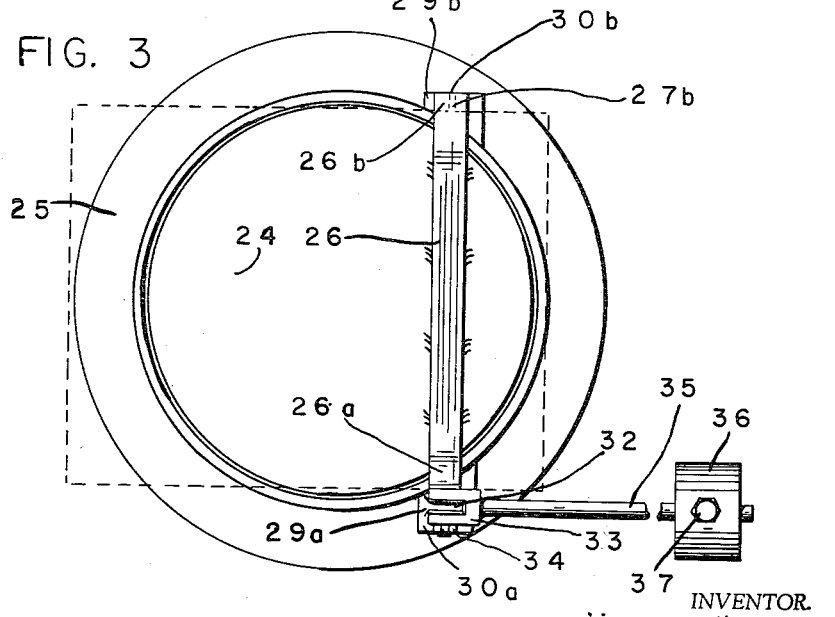
INVENTOR.
GÜNTER BÖDEKER
BY

United States Patent Office 3,123,028
Patented Mar. 3, 1964

3,123,028
DEVICE FOR CONTROLLING THE PRESSURE
IN A FURNACE CHAMBER
Günter Bödeker, Warstein, Sauerland, Germany, assignor to Industrie-Companie Kleinewefers Konstruktions- und Handelsgesellschaft m.b.H., Krefeld, Germany
Filed June 12, 1961, Ser. No. 116,504
Claims priority, application Germany June 11, 1960
3 Claims. (Cl. 110—163)

The present invention relates to a device for controlling the pressure of combustion gases of a furnace, especially a forging furnace.

In connection with the operation of forging furnaces, chamber furnaces, continuous discharge heating furnaces and the like, it has proved advantageous to maintain constant the pressure of the combustion gases in the interior of the furnace during the operation and while the conditions vary. To this end, it is known to employ ordinary control devices comprising a measuring member, amplifier, and adjusting means, which control devices are adjusted in conformity with the type of furnace acting as control path, and in conformity with the magnitude of the desired furnace pressure. Such control devices are, however, sensitive and expensive and pay only in connection with furnaces which have to meet high requirements with regard to the control of the temperature, for instance for laboratories and test purposes. With the conditions prevailing in the forging industry, such installations are, due to their high expenses for the control device, economically tolerable only with furnaces which have a high output, especially continuous discharge heating furnaces. But even in this particular field, such control devices are seldom employed.

It is, therefore, an object of the present invention to provide a device for controlling the pressure of combustion gases of a furnace, which will make it possible by simple means and without a special control device comprising a combination of measuring element, amplifier and adjusting means to adjust a certain furnace pressure and to maintain the same.

It is another object of this invention to provide a control device as set forth in the preceding paragraph, which is rather simple in construction, reliable and simple to manufacture.

These and other objects and advantages of the invention will appear more clearly from the following specification in connection with the accompanying drawings, in which:

FIG. 1 diagrammatically illustrates a longitudinal central section through a constant discharge heating furnace equipped with a control device according to the present invention which is arranged at its flue gas opening.

FIG. 2 illustrates on a somewhat larger scale than FIG. 1 the control device itself according to the invention.

FIG. 3 is a top view of the control device of FIG. 2.

The above mentioned objects have been realized according to the present invention by closing the flue gas opening by means of a flap-like member which is eccentrically tiltably journalled and the weight of which may be balanced by a counterweight in such a way that by adjusting the flap or lid and the counterweight at an angle relative to each other in such a way that the furnace pressure may be adjusted for any desired magnitude and may be maintained at a desired constant value.

Referring now to the drawing in detail, FIG. 1 illustrates a forging furnace, for instance a constant discharge heating furnace. This furnace comprises a furnace chamber 10 with a charging opening 11 adapted to be closed by a furnace door or gate 12 and through which blocks 13 are introduced into the furnace chamber. The furnace is furthermore provided with a discharge opening 14 through which the blocks 13 are withdrawn from the furnace chamber 10. One end wall 15 of the furnace chamber has mounted therein a burner 16 which through a conduit 17 is supplied with fuel and through a further conduit 18 is supplied with the necessary air. The other furnace end 19 has a flue gas opening 20 which has a tubular extension with a flange 22. Arranged on flange 22 is a control device 23 forming the closure for the flue gas opening 20.

As will be evident from FIG. 2, the control device 23 comprises a flap or lid 24 which precisely fits in an annular ring 25 having an angle-shaped cross section and being fastened to flange 22 of the tubular extension 21. Mounted on lid 24 is furthermore a transverse bar 26 which is fixedly connected to said lid for instance by welding. The two ends 26a and 26b of bar 26 are cranked or offset and have that side thereof which faces the lid 24 provided with a bearing member 27a, 27b equipped with a cutting edge 28 engaging corresponding bearing members 29a, 29b of V-shaped contour.

As will be evident from FIG. 2, the bearing members 29a, 29b are arranged at the upper end of supports 30a, 30b which are respectively connected to the opposite sides of the tubular extension 21 and, more specifically, to the horizontal part 25a of the annular member 25. The lowest point of the bearing members 29a, 29b is located precisely at the level of the horizontal center plane 31 of lid 24 so that the distribution of the weight of lid 24 resulting from the eccentric arrangement of the edges 28 will not change when the lid tilts.

The end 26a of the transverse bar 26 has that side thereof which is located opposite to the wedge portion 27a provided with a bearing eye 32 which is straddled by a fork-shaped bearing 33. A bearing bolt 34 extends through the bearing eye 32 and the fork-shaped bearing 33 so that the lever 35 will be tiltable about bolt 34 but may also be arrested relative thereto. The fork-shaped bearing 33 is provided at the end of the lever 35, while the other end of said lever 35 has displaceably and adjustably mounted thereon a counterweight 36. Said counterweight is adapted to be arrested on lever 35 by means of an adjusting screw 37. The said counterweight 36 serves for balancing the uneven distribution of the weight of the lid brought about by the eccentric support of lid 24. The counterweight 36 is so arranged that its center of gravity is located in the central plane of lid 24. This is made possible by a crank 38 of lever 35. In order to prevent lid 24 from moving beyond its closing position, there is provided an abutment 39.

*Operation*

The control device according to the present invention operates in the following manner. It will be evident that the flue gases 40 passing through the flue opening 20 will exert a pressure upon lid 24 and will tend to lift the same. It is also possible, by adjusting the displaceable counterweight 36 to adjust the furnace pressure for a certain magnitude, which is actually done prior to starting the operation. Since on one hand the resistance of lid 24 changes in conformity with its opening angle and inasmuch as furthermore the dynamic pressure acting upon lid 24 changes with the furnace load, it will be evident that also the counter-pressure exerted by lid 24 must change with the opening angle of said lid. To this end, it is necessary that it will be possible to adjust the angle alpha between the central plane 31 of lid 24 and the connecting line 41 between the pivot point 28 and the center of gravity 42 of lever 35. In this way lever 35 with counterweight 36 will be turnable about its connecting point. The adjustment for a selected furnace presure will be effected only once. Lid 24 will then maintain the furnace pressure constant at high compression for varying charges of the furnace.

According to another embodiment of the present invention, lid 24 may also be of rectangular shape and may be installed in a housing in such a way that it can be connected to a flue. Due to the effect of the flue, even higher adjusting forces will be obtained which will permit an even more precise adjustment of lid 24 and which will make it possible at even higher precision to maintain the furnace pressure constant.

It is, of course, to be understood that the present invention is, by no means, limited to the particular constructions shown in the drawings but also comprises any modifications within the scope of the appended claims.

What I claim is:

1. In combination; a forging furnace having a flue gas passage terminating in means forming an opening disposed in a horizontal plane, and a device for effecting precise cotrol of the pressure in the furnace, said device comprising a flat horizontal lid means tiltably supported on the furnace in said opening for controlling gas flow through said fluid gas passage, the tilting axis of said lid means being fixed relative to the lid means and being located in substantially the central plane of said lid means, said central plane extending in the direction of the top surface of said lid means, the tilting axis of said lid means being located between the middle of the lid means and one side edge thereof so the gas pressure in the furnace will exert a tilting effort on said lid means, support means on said axis for supporting said lid means, a counterbalance means connected to the lid means to counterbalance the off center weight thereof whereby the lid means will hold a selected pressure of the combustion gases in said furnace substantially constant within close predetermined limits, said counterbalance means comprising an arm connected to the lid means and angularly adjustable thereon in a vertical direction and weight means on the arm adjustable thereon toward and away from said lid means, said supporting means comprising stationary upwardly opening V-shaped supporting surface means on said furnace and downwardly facing knife edge means on the lid means journalled in said V-shaped surface means, the engagement of the knife edge means with the supporting surface means being precisely on said tilting axis.

2. An arrangement according to claim 1, in which said supporting surface means define an angle substantially larger than the angle of said knife edge means whereby the location of said tilting axis does not change as the lid means tilts.

3. An arrangement according to claim 1, in which said arm is so formed as to have a portion that can be located in the central plane of the lid means, said weight means being mounted on said portion of the arm.

References Cited in the file of this patent
UNITED STATES PATENTS

| | | |
|---|---|---|
| 490,177 | Thiell | Jan. 17, 1893 |
| 1,338,899 | Brown | May 4, 1920 |
| 1,574,711 | Steele | Feb. 23, 1926 |
| 2,117,672 | Linhard | May 17, 1938 |
| 2,557,210 | Viola et al. | June 19, 1951 |